(No Model.)
2 Sheets—Sheet 1.
S. G. A. URQUHART.
CAR COUPLING.
No. 279,675. Patented June 19, 1883.
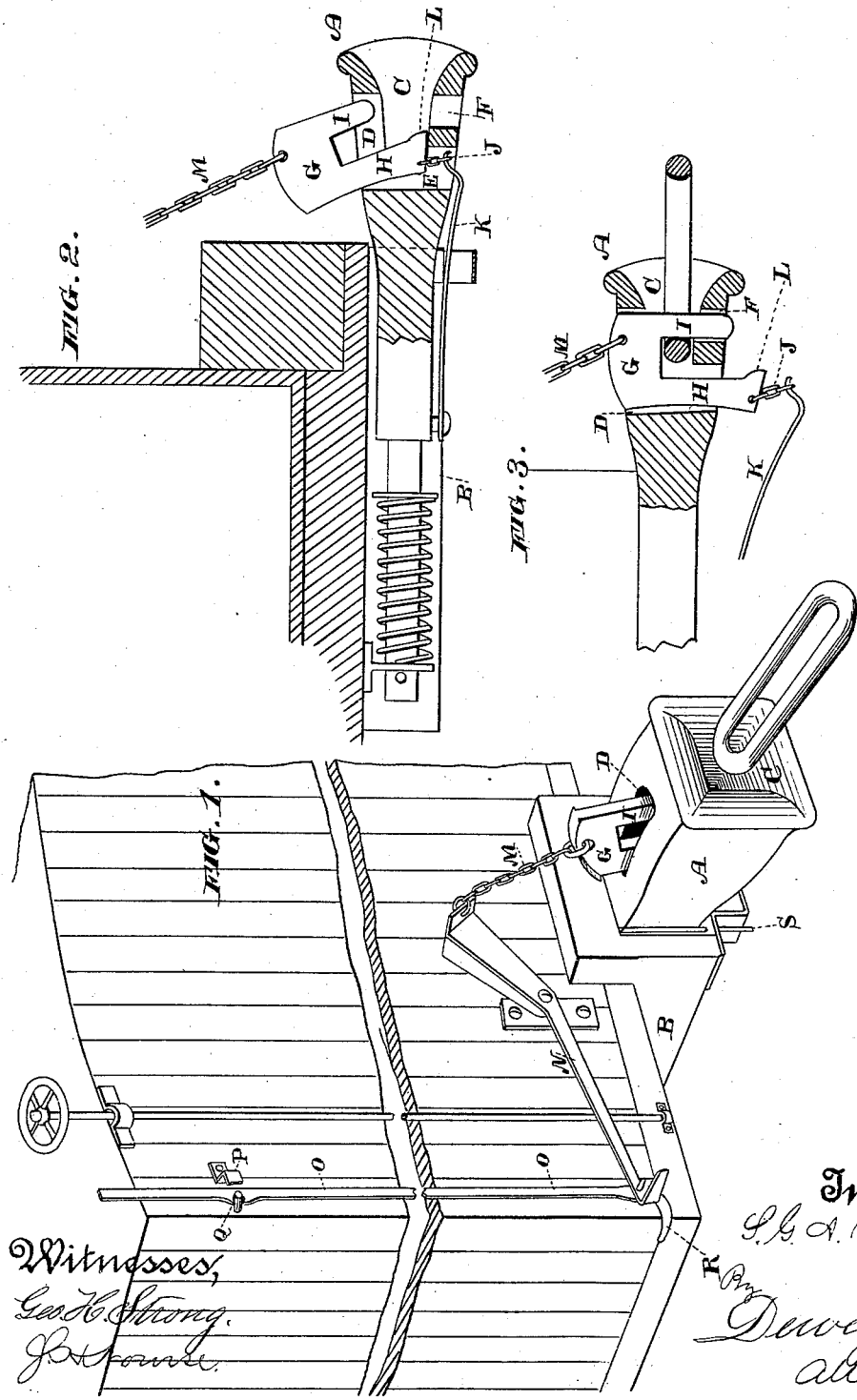
Witnesses,
Geo. H. Strong.
Inventor
S. G. A. Urquhart
By Dewey & Co.
Attorneys (No Model.) 2 Sheets—Sheet 2.

S. G. A. URQUHART.
CAR COUPLING.

No. 279,675. Patented June 19, 1883.

Witnesses,
Geo. H. Strong.

Inventor,
S. G. A. Urquhart
By Dewey & Co.
Attorneys

UNITED STATES PATENT OFFICE.

SAMUEL G. A. URQUHART, OF SAN FRANCISCO, CALIFORNIA.

CAR-COUPLING.

SPECIFICATION forming part of Letters Patent No. 279,675, dated June 19, 1883.

Application filed February 27, 1883. (No model.)

*To all whom it may concern:*

Be it known that I, SAMUEL G. A. URQUHART, of the city and county of San Francisco, State of California, have invented an Improved Car-Coupling; and I hereby declare the following to be a full, clear, and exact description thereof.

My invention relates to certain improvements in car-couplings; and it consists of a novel construction of a bumper loosely supported from its rear end to allow movement of its front end; of a spring-actuated coupling-pin of peculiar form, and lever connections by which the pin may be raised for the admission of an approaching link, so as to couple therewith; and of certain details of construction, which will be more fully explained by reference to the accompanying drawings, in which—

Figure 4:
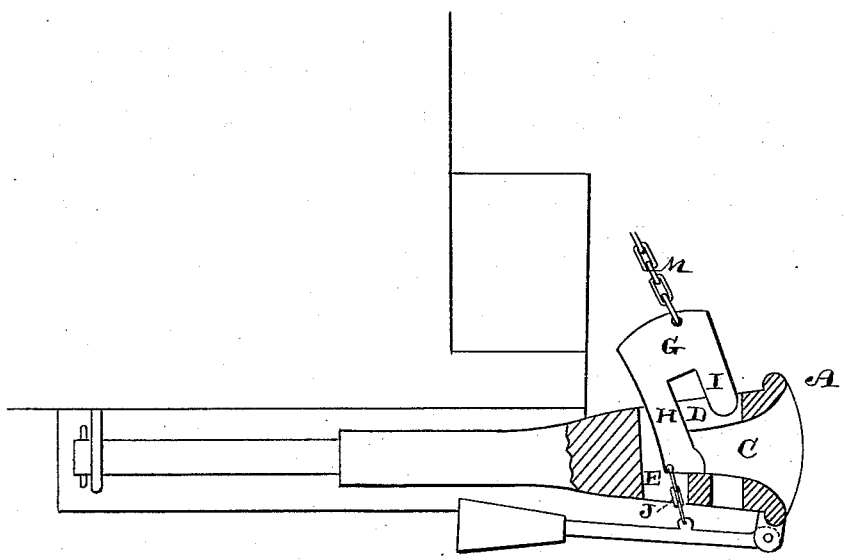
Figure 5:
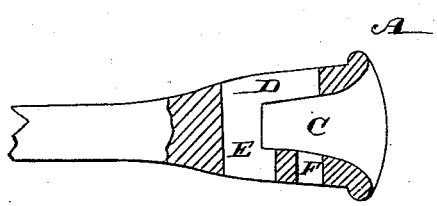

Figure 1 is a view of my invention. Figs. 2, 3, and 5 are sections of my invention. Fig. 4 is a modification.

A is a bumper or draw-head which extends between the timbers B beneath a car, and has its rear end suitably connected with the car, and having the customary spring behind it to prevent shocks from meeting other cars. The connection at the rear end of the bumper is made loose to allow the head to move vertically a short distance for the purpose of adjusting itself to an approaching car having the bumper of a different height.

The opening C is made with a flaring mouth in the usual manner to receive a link, and an elongated vertical opening or slot, D, is made through the top of the bumper, extending into the upper part of the link-opening. The rear portion of the slot is continued through the lower part of the bumper, as at E, and a hole, F, passes through in line with the front part, but separated from the slot by a partition, as shown. These openings receive the coupling device, which consists of a broad plate, G, sliding into the upper part, an extension, H, projecting downward from the rear edge to enter the slot E, and the pin I, which passes through the hole F and holds the link when the latter is in place. That portion of the plate G between the pin and the extension H rests upon the top of the link, and thus keeps the front end from dropping by its own weight. The part H has a link or chain, J, extending downward from it and connecting with a spring, K, which extends back beneath the bumper, and has sufficient tension to draw the coupler down with considerable force. A toe or lug, L, is formed upon the front part of the extension H, and the connecting-link between the extension and the spring stands at such an angle, when the coupling is drawn up, that the toe will spring forward and rest upon the rear part of the bottom of the link-opening, and thus hold the pin I (which is considerably shorter) above the opening, so that the link from an approaching car may enter beneath it. The link passes on until it strikes the extension H and pushes it back far enough to release the toe and allow the coupler to fall, the pin passing through the link and retaining it in place.

From the upper part of the coupler a chain or link, M, connects with the inner end of a lever, N, which has its fulcrum upon the end of the car and extends to the side, so that it can be operated without going between the cars. Whenever the outer end of this lever is pulled down, the coupler will be lifted, and if the link is not pressed against the rear of the link-opening by another car the lower part of the extension will be thrown forward by the action of the spring K upon the link J, standing at an angle, as before described, and the toe L will rest upon the bottom of the link-opening. If a link is already in the bumper and there is another in the approaching car, one link may be ejected from its bumper by the sudden motion forward of the part H when the toe passes the bottom of the link-opening. This is very convenient when the coupler is operated from the top of a car, as it avoids the necessity for descending. In order to operate it from the top of a car, a rod, O, is connected with the outer end of the lever N and extends up through a guide, P. This rod has a notch, Q, which may be caused to engage with the side of the guide when desired, and thus hold the coupler up and prevent its falling when a link enters and it is not desired to have it couple. The lower end of the vertical rod curves out, as shown at R, and by pushing up or pulling down on this curved end the notch may be disengaged or engaged while the operator is on the ground beside the car. When the coupler is down, the toe L projects beneath the bumper and prevents the pin working out by the constant strain and motion when going up grades. Provision is made for shocks which would be sufficient to break the bumper, or parts thereof, by confining its front end between vertical bars or pins S, of sufficient strength to hold it in place ordinarily, but which will break and allow the bumper to slide back in case of a very violent shock. The spring K will also shut up close, and the link connecting it with the pin will slip off, leaving it clear. If the bumper or draw-head should be pulled out, the pin would be easily detached from its spring and be pulled out, so that the least possible injury would be done.

It will be manifest that in place of the spring K a weighted lever-arm may be connected with the coupler extension H, the operation being essentially the same.

Having thus described my invention, what I claim as new, and desire to secure by Letters Patent, is—

1. In a car-coupling, and in combination with a draw-head having the upper part slotted and the lower part perforated to receive a vertically-moving coupler, a spring extending beneath the draw-head to a point in front of the extension H, and connected with said extension by an inclined link, J, substantially as herein described.

2. In a car-coupling, a draw-head slotted and perforated to receive a vertically-moving coupler, a spring extending beneath the draw-head to a point in front of the coupler extension, and connected therewith by an inclined link, in combination with a horizontal lever, N, and a vertical notched rod, O, with an arm, R, at its lower end, substantially as herein described.

In witness whereof I hereunto set my hand.

SAMUEL G. A. URQUHART.

Witnesses:
S. H. NOURSE,
G. W. EMERSON.